US010768326B2

United States Patent
Nguyen et al.

(10) Patent No.: US 10,768,326 B2
(45) Date of Patent: Sep. 8, 2020

(54) BOUNDARY ADJUSTMENT OF VERTICAL SEISMIC SECTIONS OF THREE-DIMENSIONAL SEISMIC SURVEYS TO REMOVE DATA GAPS

(71) Applicant: Landmark Graphics Corporation, Houston, TX (US)

(72) Inventors: Nam Xuan Nguyen, Katy, TX (US); Richard George Maset, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 345 days.

(21) Appl. No.: 15/762,692

(22) PCT Filed: Oct. 9, 2017

(86) PCT No.: PCT/US2017/055705
§ 371 (c)(1),
(2) Date: Mar. 23, 2018

(87) PCT Pub. No.: WO2018/093476
PCT Pub. Date: May 24, 2018

(65) Prior Publication Data
US 2019/0086569 A1    Mar. 21, 2019

Related U.S. Application Data

(60) Provisional application No. 62/424,127, filed on Nov. 18, 2016.

(51) Int. Cl.
*G01V 1/34* (2006.01)
*G01V 1/28* (2006.01)
*G01V 3/38* (2006.01)

(52) U.S. Cl.
CPC ............... *G01V 1/345* (2013.01); *G01V 1/28* (2013.01); *G01V 1/34* (2013.01); *G01V 3/38* (2013.01); *G01V 2210/612* (2013.01); *G01V 2210/6161* (2013.01); *G01V 2210/74* (2013.01)

(58) Field of Classification Search
None
See application file for complete search history.

(56) References Cited

U.S. PATENT DOCUMENTS

| 5,132,938 | A | 7/1992 | Walters |
| 5,671,136 | A | 9/1997 | Willhoit, Jr. |
| 6,226,596 | B1 | 5/2001 | Gao |
| 8,213,261 | B2 * | 7/2012 | Imhof ............... G01V 1/32 367/14 |
| 2010/0161232 | A1 | 6/2010 | Chen et al. |

(Continued)

FOREIGN PATENT DOCUMENTS

WO    WO 2010/080366 A1    7/2010

OTHER PUBLICATIONS

Search Report and Written Opinion issued for French Patent Application No. 1760045, dated Oct. 1, 2019, 6 pages.

(Continued)

*Primary Examiner* — Roy Y Yi
(74) *Attorney, Agent, or Firm* — Haynes and Boone, LLP

(57) ABSTRACT

Systems and methods of the present disclosure are directed to adjustment of seismic survey boundaries to remove or minimize data gaps, thereby providing optimized seismic interpretation.

12 Claims, 15 Drawing Sheets

(56) References Cited

U.S. PATENT DOCUMENTS

2011/0307178 A1    12/2011  Hoekstra
2012/0316847 A1*  12/2012  Hantschel .............. G06Q 10/00
                                                            703/2

OTHER PUBLICATIONS

Seismic Profile Data Management, https://www.troika-int.com/images/articles/datamanagement_2015.pdf, Jan. 1, 2015.
WOW Software Release Notes, http://esd.halliburton.com/esd/software/imi/webapps/5000/update/5000_0_1_10/wow_relnotes.pdf, Sep. 1, 2013.
International Search Report and The Written Opinion of the International Search Authority, or the Declaration, dated Jul. 18, 2018, PCT/US2017/055705, 10 pages, ISA/KR.
Office Action issued for Canadian Patent Application No. 3036934, dated May 4, 2020, 6 pages.

* cited by examiner

BOUNDARY ADJUSTMENT OF VERTICAL SEISMIC SECTIONS OF THREE-DIMENSIONAL SEISMIC SURVEYS TO REMOVE DATA GAPS

PRIORITY

The present application is a U.S. National Stage patent application of International Patent Application No. PCT/US2017/055705, filed on Oct. 9, 2017, which claims the benefit of U.S. Provisional Application No. 62/424,127, entitled "VERTICAL SEISMIC SECTION CONTROL ACROSS MULTIPLE THREE-DIMENSIONAL SEISMIC SURVEYS," filed on Nov. 18, 2016, also naming Nguyen et al. as inventors, the disclosures of which are incorporated herein by reference in their entirety.

FIELD OF THE DISCLOSURE

The present disclosure relates generally to seismic interpretation and, more specifically, to the removal of data gaps between vertical seismic sections of subsurface formation surveys.

BACKGROUND

In the field of hydrocarbon exploration and production, seismic surveys may be performed to gain an understanding of the depth and structures of subsurface geological formations. A seismic survey may involve using various seismic sources, such as dynamite, "thumper" trucks, air guns, or other noise sources located at the surface of a hydrocarbon bearing field to propagate seismic waves through an underground formation. The propagated waves are reflected through the formation and acquired using various seismic signal receiver devices, for example, geophones, hydrophones, and the like. Seismic-data traces including a record of the sound wave reflections acquired from a three-dimensional ("3D") seismic survey of the underground formation may be used to identify subsurface geological structures, including faults and other stratigraphic features that trap hydrocarbon and mineral deposits.

Interpretation of such seismic reflection data often involves analyzing multiple volumes of seismic data across multiple 3D seismic surveys to find interrelationships between the different seismic datasets and identify relevant events within the subsurface formation that may affect hydrocarbon exploration and production operations. Seismic interpretation tools are available to facilitate this type of data analysis. However, such tools typically provide a user with only a static view of the seismic data from the multiple 3D surveys. Hence, seismic interpretation using such conventional tools may be difficult in cases where there are gaps in the seismic data being analyzed. Such a data gap may be due to, for example, null or poor quality seismic traces acquired for a corresponding region of the subsurface formation. In such cases, a user may have to manually rearrange and sort through the volumes of seismic data in order to perform the seismic interpretation effectively. This reduces efficiency and the user's overall experience in using the seismic interpretation tools to perform the seismic interpretation.

DESCRIPTION OF ILLUSTRATIVE EMBODIMENTS

Figure 1A:
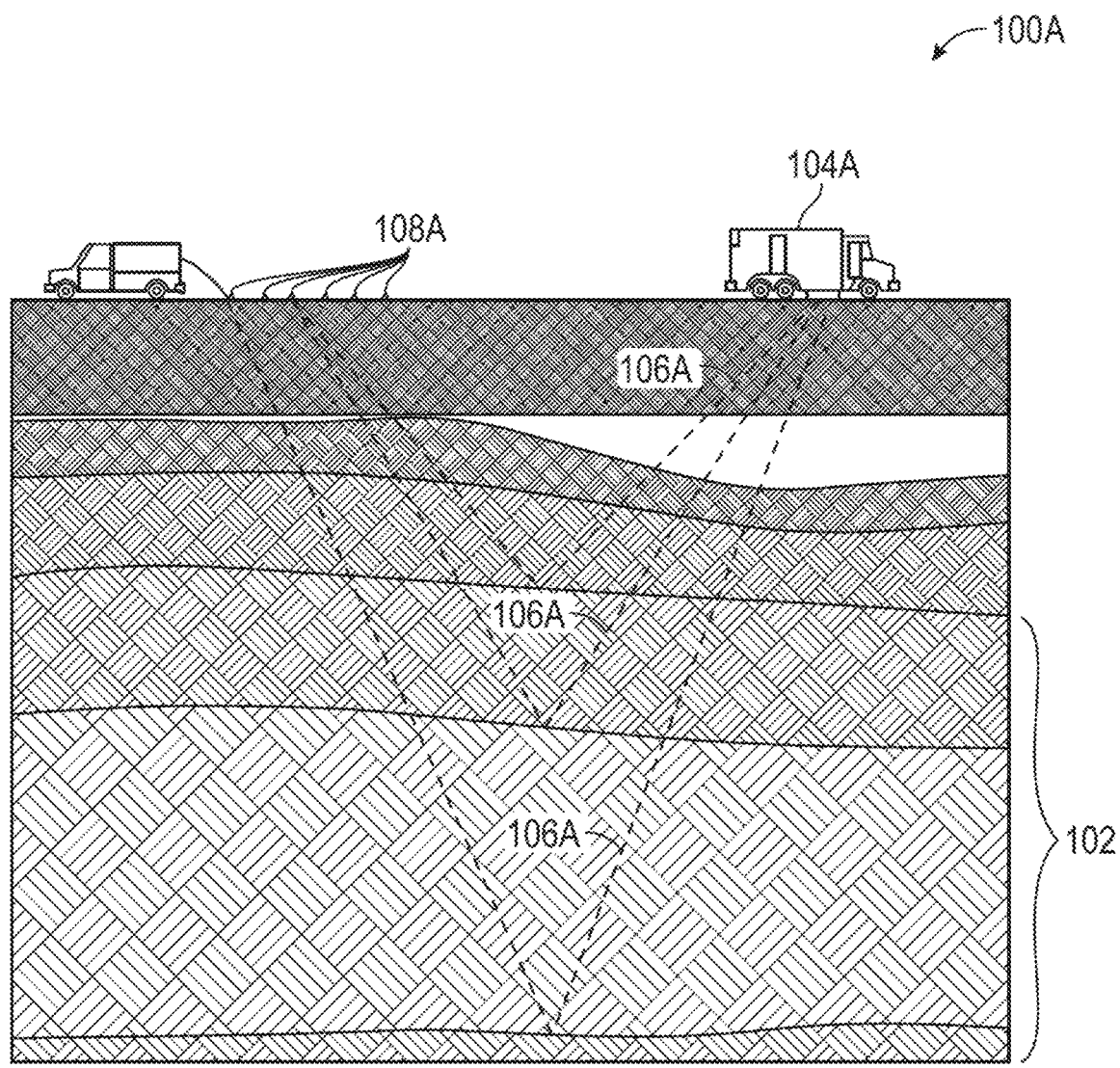
FIG. 1A is a side elevation view of a surface seismic survey system for a subsurface formation in accordance with one or more embodiments.

Illustrative embodiments and related methods of the present disclosure are described below as they might be employed in systems and methods to adjust seismic section boundaries for optimized seismic interpretation. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative systems and methods of the present disclosure are directed to adjustment of seismic section boundaries for optimized seismic interpretation. In a generalized method, a computer processing system displays a vertical seismic section across a plurality of 3D seismic surveys within a GUI of an application executable on a user computing device. An outline of a live seismic trace obtained from seismic volumes represented in the vertical seismic section is then identified; this outline is referred to as a live trace outline ("LTO"). Upon determining that at least two of the 3D seismic surveys are overlapping, the system determines whether any data gaps exist within at least one of the LTOs identified for an area of the vertical seismic section corresponding to the overlapping 3D seismic surveys. If data gaps exist, the boundary of a selected overlapping 3D seismic survey is adjusted so as to remove the data gap from the corresponding area of the vertical seismic section. As will be discussed below, the adjustment can be achieved using manual or automated means. Accordingly, unwanted gaps caused by null traces or low quality traces are eliminated, thereby greatly increasing the productivity of workflow interpretation across multiple overlapping 3D seismic surveys. Moreover, the present disclosure provides seismic data analysis across the different surveys with the least amount of cursor clicks (e.g., 2 clicks instead of 20 clicks with conventional approaches).

Embodiments of the present disclosure may be used to facilitate the interpretation of seismic data to identify subsurface geological features from multiple 3D seismic surveys of a subsurface formation. For example, the interpretation may be performed by a user of a seismic interpretation application executable at the user's computing device. Such an application may be the DecisionSpace® Geoscience software platform, commercially available from Landmark Graphics Corp. of Houston, Tex. The user may interact with a GUI of the application to select a two-dimensional ("2D") vertical seismic section or slice of seismic data across a plurality of 3D seismic surveys. A 2D and/or 3D representation of the selected vertical seismic section may be displayed within the GUI for interpretation by the user. The vertical seismic section may be displayed within a portion of the GUI as, for example, a plurality of 2D seismic traces, from which the user may specify or pick horizons and other stratigraphic features of the subsurface formation via the GUI and a user input device coupled to the user's computing device. However, some of the plurality of 3D surveys in this example may overlap in areas corresponding to different segments and associated seismic datasets of the vertical seismic section. Moreover, there may be gaps in the data ("data gaps") between the different segments and datasets of the vertical seismic section within the overlapping area.

As will be described in further detail below, embodiments of the present disclosure may be used to analyze the seismic datasets of the vertical seismic section across overlapping 3D surveys to determine whether any data gaps exist within the overlapping area. In one or more embodiments, the dataset boundaries for a portion of the vertical seismic section corresponding to the overlapping area may be adjusted or controlled such that any data gaps are removed or minimized and the interpretation of the seismic data can be optimized. In this way, the disclosed embodiments may be used to provide a more meaningful visual representation of the vertical seismic section, which enables the user to interpret the seismic data more efficiently and effectively, without having to manually and repeatedly readjust the vertical seismic section itself to achieve the desired location of dataset boundaries as in conventional seismic interpretation tools.

Illustrative embodiments and related methods of the present disclosure are described below in reference to FIGS. 1A-8 as they might be employed in, for example, a computer system for seismic interpretation and data analysis. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only illustrative and are not intended to assert or imply any limitation with regard to the environment, architecture, design, or process in which different embodiments may be implemented.

In the following examples, seismic survey data along with other available geophysical, borehole, and geological data may be used to provide information about the structure and distribution of rock types and properties of different layers of a subsurface formation. Different types of seismic surveying will be described in further detail below with respect to FIGS. 1A and 1B. While the seismic surveys in the following examples are described in the context of land-based seismic surveying, it should be noted that the techniques disclosed herein are not intended to be limited thereto and that these techniques may be applied to seismic surveys performed on land or in water, e.g., as part of an on-shore or off-shore drilling operation, respectively. Furthermore, it should be appreciated that the term "seismic survey" is used herein to refer to the seismic surveying procedures used to obtain seismic data from a subsurface formation, as well as to the seismic data that is obtained.

FIG. 1A is a side elevation view of a surface seismic survey system 100A for a subsurface formation 102 in accordance with one or more illustrative embodiments of the present disclosure. Subsurface formation 102 may be, for example, a hydrocarbon bearing formation including a plurality of stratigraphic layers. System 100A may be used to conduct a surface seismic survey that provides a seismic mapping of formation 102. System 100A includes a seismic source 104A and an array of seismic receivers 108A. As shown in FIG. 1A, seismic source 104A may be a specialized "thumper" truck that generates seismic energy 106A. However, it should be noted that embodiments are not limited thereto and that seismic source 104A may be implemented using any of various other types of seismic sources including, but not limited to, air guns, dynamite or other types of explosives.

In conducting the surface seismic survey, seismic energy 106A may be shot from source 104A in the form of pulses or waves that propagate to and encounter different layers of formation 102. For each layer encountered, a portion of seismic energy 106A is reflected back towards the earth's face and received by one or more receiver devices in the array of seismic receivers 108A at the surface. Each receiver may be a surface seismic sensor, e.g., a geophone or hydrophone, for detecting waves of seismic energy 106A shot from source 104A and recording arrival times and amplitudes of the detected waves.

The surface seismic survey conducted using system 100A may be, for example, an initial exploratory survey conducted over a relatively large area of earth in order to obtain a low resolution mapping of the geometry of subsurface formation 102. Such a broad-based seismic survey may be used in conjunction with core samples and/or well logs from one or more exploratory wellbores for purposes of hydrocarbon exploration and well planning. From the initial exploratory survey, a determination as to which specific location is likely to contain hydrocarbons may be made. For further exploration and planning purposes, a more detailed VSP survey of the particular location may be conducted, as will be described in further detail below with respect to FIG. 1B.

Figure 1B:
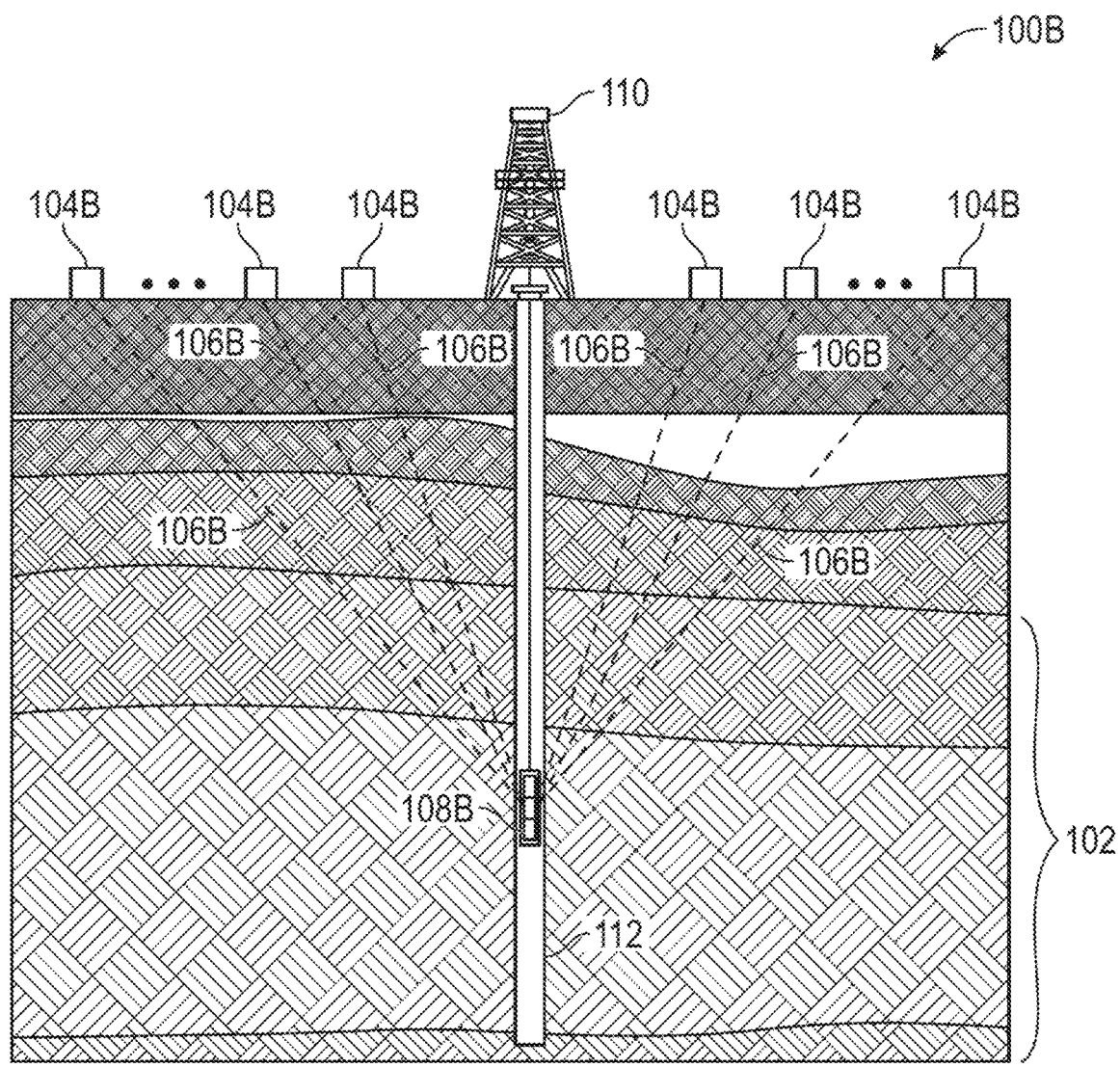
FIG. 1B is a side elevation view of a vertical seismic profile ("VSP") survey system for the subsurface formation of FIG. 1A in accordance with one or more embodiments.

FIG. 1B is a side elevation view of a vertical seismic profile (VSP) survey system 100B for subsurface formation 102 of FIG. 1A. As shown in FIG. 1B, a drilling rig 110 at the surface may be used to drill a borehole 112 into different layers of formation 102. A plurality of seismic sources 104B at the surface are used to generate seismic energy 106B that propagates through the different layers of formation 102, as described above. It should be appreciated that any number of sources may be used as desired for a particular implementation. Seismic sources 104B may be implemented using any of various seismic source devices, e.g., dynamite or other explosives, thumper trucks, air guns, or other noise sources. The waves of seismic energy 106B and direct arrival times from sources 104B are detected and recorded by an array of seismic receivers 108B disposed within borehole 112. Seismic receivers 108B may be, for example, an array of downhole seismic sensors, e.g., geophones or hydrophones, coupled to or integrated within a bottom hole assembly of a drill string or wireline logging device disposed within borehole 112.

In one or more embodiments, survey system 100A of FIG. 1A and/or survey system 100B of FIG. 1B may be used to produce a plurality of 3D seismic surveys. Each 3D seismic survey may include a plurality of seismic traces collected over a survey area within the subsurface formation. Such a survey area may be, for example, a predefined area of the subsurface formation, which has been targeted for hydrocarbon exploration and production. While not shown in FIG. 1A or 1B, it should be appreciated that each of survey systems 100A and 100B may include one or more computing devices located at the surface of the formation. Such a surface computing device may be communicatively coupled to the seismic receivers of the respective seismic survey systems for collecting and storing the seismic surveys for later access and retrieval. In some implementations, the surface computing device may execute a seismic interpretation application in which the disclosed techniques may be implemented for optimizing the visualization and interpretation of seismic data across overlapping 3D seismic surveys. Alternatively, the surface computing device may be used to transmit the 3D seismic surveys from the well site via a local-area or wide-area network (e.g., the Internet) to a remote computing device in which the disclosed techniques may be implemented.

In one or more illustrative embodiments, a visual representation of a plurality of the 3D seismic surveys may be displayed to a user via a GUI of a seismic interpretation application executable at the user's computing device. Such a computing device may be implemented using any type of device having one or more processors, a user input (e.g., a mouse, QWERTY keyboard, touch-screen, a graphics tablet, or microphone), a display, and a communications infrastructure capable of receiving and transmitting data over a network. An example of such a computing device will be described in further detail below with respect to FIG. 7.

Figure 2A:
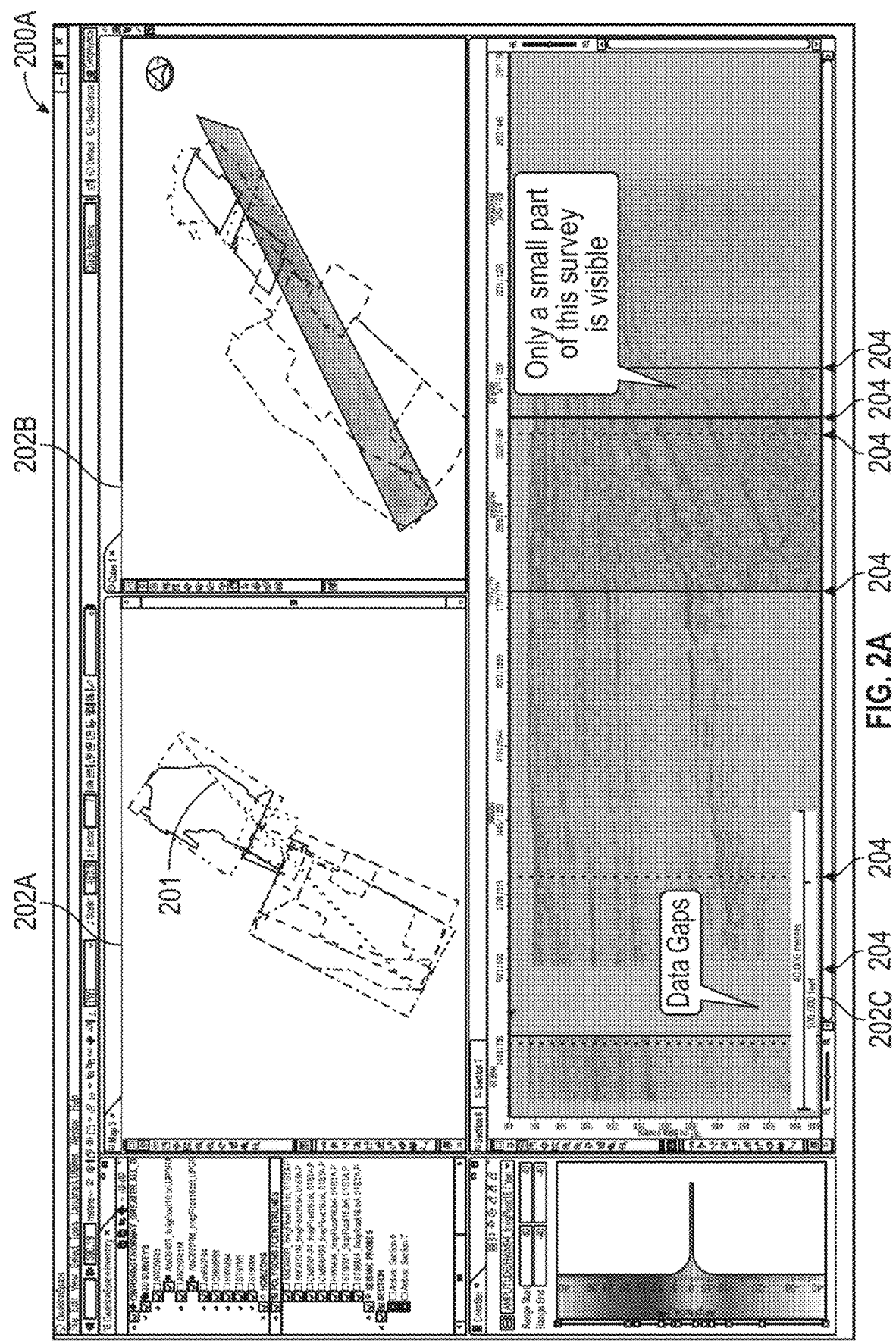
FIGS. 2A and 2B are different views of an illustrative graphical user interface ("GUI") for seismic interpretation of a vertical seismic section across a plurality of 3D seismic surveys.
Figure 2B:
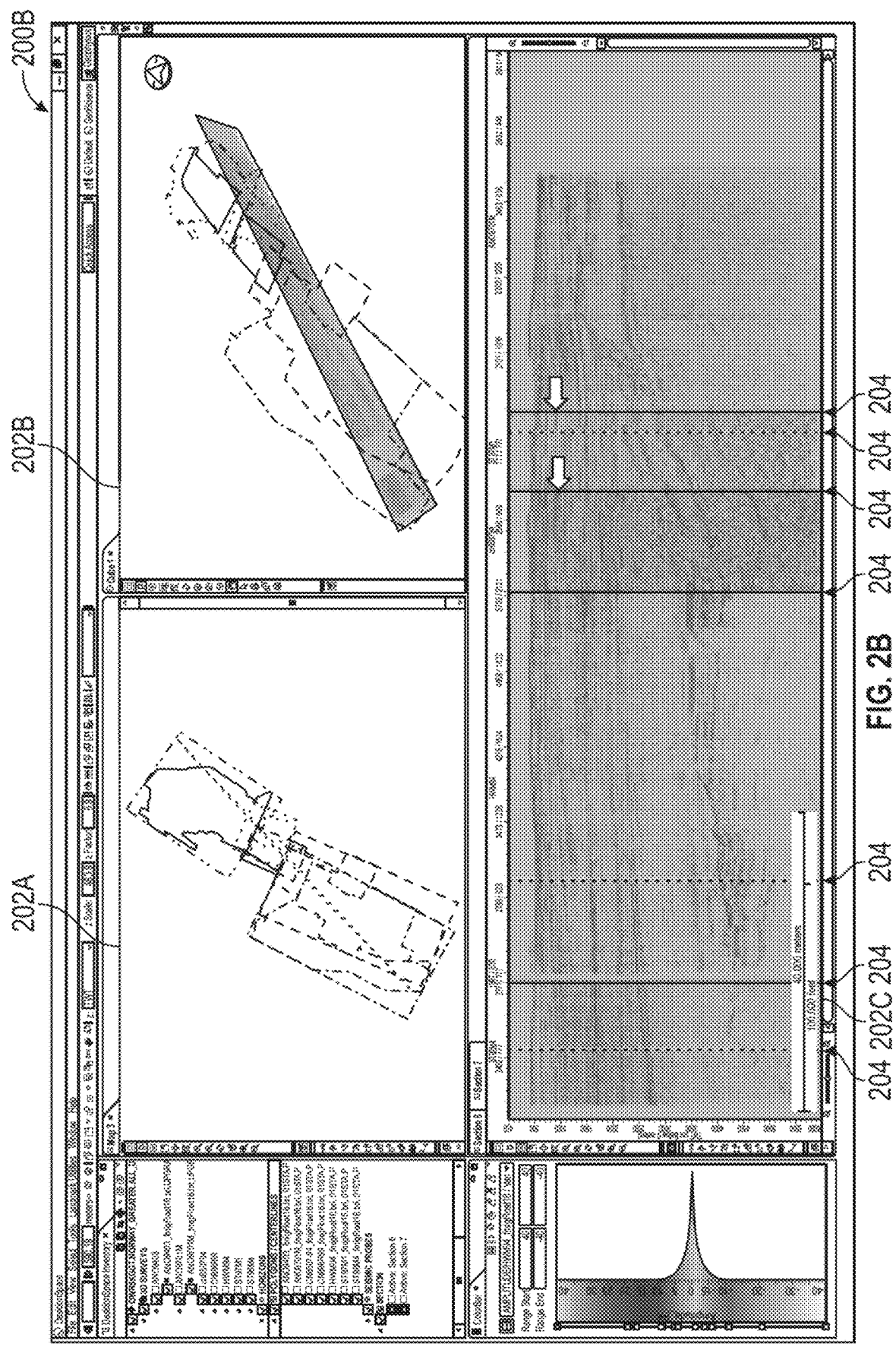

Examples of a GUI for the seismic interpretation application executable at the user's device are shown in FIGS. 2A and 2B. FIGS. 2A and 2B are different views of an illustrative GUI for seismic interpretation of a vertical seismic section across a plurality of 3D seismic surveys. In FIG. 2A, a view 200A of the GUI shows a number of visualization windows 202A, 202B, and 202C in which different views of the vertical seismic section may be displayed. Such views may include 2D and/or 3D representations (in windows 202A and 202B) of the vertical seismic section in window 202C and/or a plurality of 3D seismic surveys in windows 202A and 202B. For example, the GUI may include separate visualization windows 202A and 202B that show either a 2D map view 202A or a 3D cube view 202B of the seismic section. In the 2D map view 202A, the seismic section may be displayed as a line 201 (representing a vertical seismic cross-section of the subsurface) that intersects the plurality of 3D surveys over a corresponding survey area.

In one or more embodiments, the seismic section and survey area may be based on input received from a user via the GUI. For example, the user may interact with the GUI to select the plurality of 3D surveys from a list of available 3D surveys for purposes of performing seismic interpretation. The selected 3D surveys may be displayed within the map view of the visualization windows 202A-202D. The user may then interact with the 2D map view within the visualization windows 202A and 202B of the GUI to specify endpoints of the cross-section line representing the vertical seismic section of interest across the plurality of 3D surveys.

In addition to the visualization windows for displaying 2D and 3D views of the seismic section, the GUI 200A includes a separate visualization window 202C to display a view of the vertical seismic section as a plurality of seismic traces, which may be used for seismic interpretation. Such a seismic trace viewer of the GUI 200A may display the seismic traces over different segments of the vertical seismic section across the plurality of 3D surveys (corresponding to line 201). Divider lines 204 may be displayed to indicate the boundaries between different segments. In some cases, the segment boundaries 204 may correspond to the boundaries of overlapping 3D surveys. However, the boundaries of the overlapping 3D surveys (in window 202B) generally do not coincide with the outlines of seismic traces (shown in 202C) within the respective survey boundaries. Moreover, as shown in FIG. 2A, there may be gaps in the seismic data (shown in window 202C) for segments where the overlapping survey boundaries have null traces or lack traces that are of sufficient quality to perform seismic interpretation. Such data gaps may prevent the user from performing the seismic interpretation in an effective and efficient manner. In addition, there may be segments where only a small part of the survey is shown, such as indicated in FIG. 2A—which may also lead to inefficient seismic interpretation.

Accordingly, illustrative embodiments of the present disclosure may be used to adjust or control the dataset boundaries 204 for segments of the vertical seismic sections in window 202C that correspond to an overlapping area of 3D surveys in windows 202A and/or 202B such that any data gaps within this area are removed or minimized, thereby optimizing the visual representation of the data and the seismic interpretation thereof.

FIG. 2B is a view 200B of the GUI in which boundaries 204 of the segments and associated datasets of the seismic section as displayed within the seismic trace viewer of GUI 200B have been adjusted so as to remove the data gaps. In one or more embodiments as described in more detail below, boundaries 204 may be adjusted manually or automatically based on various factors affecting the display of the vertical seismic section for seismic interpretation. Such factors may include, for example and without limitation, the priority of each 3D survey, the boundaries and/or volume of the seismic survey, and the seismic trace outline contained within the survey.

In one or more embodiments, slider controls dividing the different data segments and surveys within the vertical seismic section of window 202C may be provided within the seismic trace viewer of the GUI. Examples of slider or dragger controls may include a click-and-drag function at the liner representing the current overlap boundary, keyboard arrow keys, a separate controller dialog, etc., thus enabling interactive manipulation between survey segments. A different slider control may be displayed for each seismic segment and associated survey boundary 204 represented within the seismic section. For example, the user may use a pointing device (e.g., a mouse) to move or reposition the slider control and thereby manually adjust the location of the corresponding boundary, e.g., as shown in FIG. 2B by the double arrows indicating survey boundaries that have been adjusted by the user via corresponding divider controls within the GUI. As a result, a greater portion of that survey is now being shown in utilized in the interpretation.

Although not shown, the slider control has also been used to manually remove the data gap, as shown in FIG. 200B. In other illustrative methods, however, the computing device may automatically adjust boundaries 204 to remove the data gaps and other manipulate boundaries 204 for other desired reasons. Further detail on the implementation of both methods will be discussed in more detail below.

Figure 3:
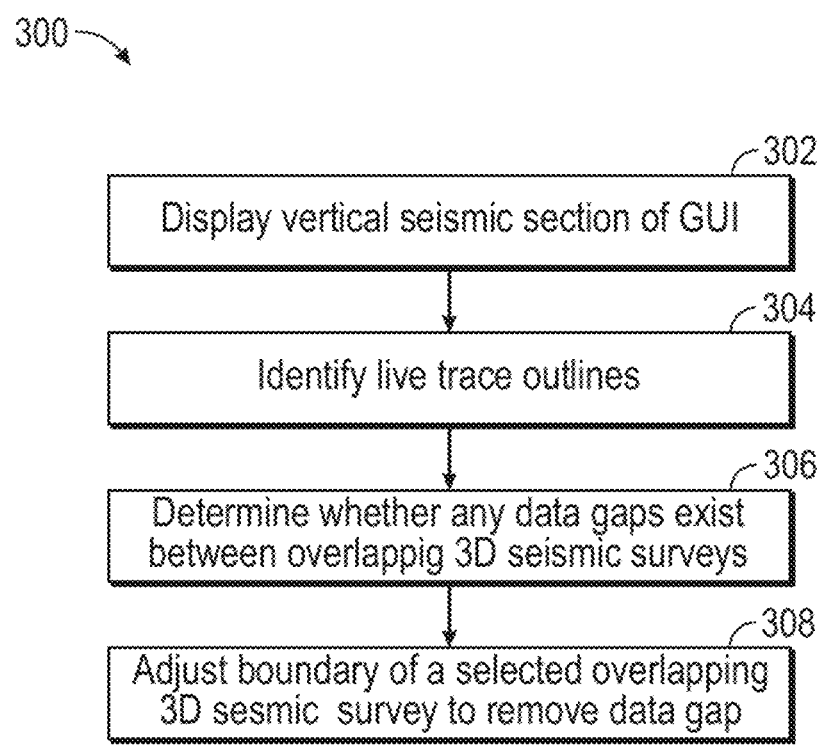
FIG. 3 is a flow chart of a general method for adjusting seismic section boundaries for optimized seismic interpretation, according to certain illustrative methods of the present disclosure.

FIG. 3 is a flow chart of a general method 300 for adjusting seismic section boundaries for optimized seismic interpretation, according to certain illustrative methods of the present disclosure. With reference to FIGS. 2A, 2B and 3, at block 302, the computing system displays a vertical seismic section (in window 202C) across a plurality of 3D seismic surveys (windows 202A and/or 202B) within a GUI an application executable on a user computing device. At block 304, the system identifies an outline of a live seismic trace in windows 202A and/or 202B from seismic volumes represented in the vertical seismic section, the outline being referred to as a live trace outline ("LTO"). At block 306, upon determining that at least two of the 3D seismic surveys are overlapping in windows 202A and/or 202B, the system and/or user determines whether any data gaps exist within at least one of the LTOs identified for an area of the vertical seismic section corresponding to the overlapping 3D seismic surveys. At block 308, upon determining a data gap does exist, the system (if in automated mode) or user (if in manual mode) adjusts the boundary of a selected one of the overlapping 3D seismic surveys so as to remove the data gap from the corresponding area of the vertical seismic section. Thereafter, the seismic interpretation is optimized and may be used to perform a variety of wellbore operations (e.g., drilling or production operations).

Figure 4A:
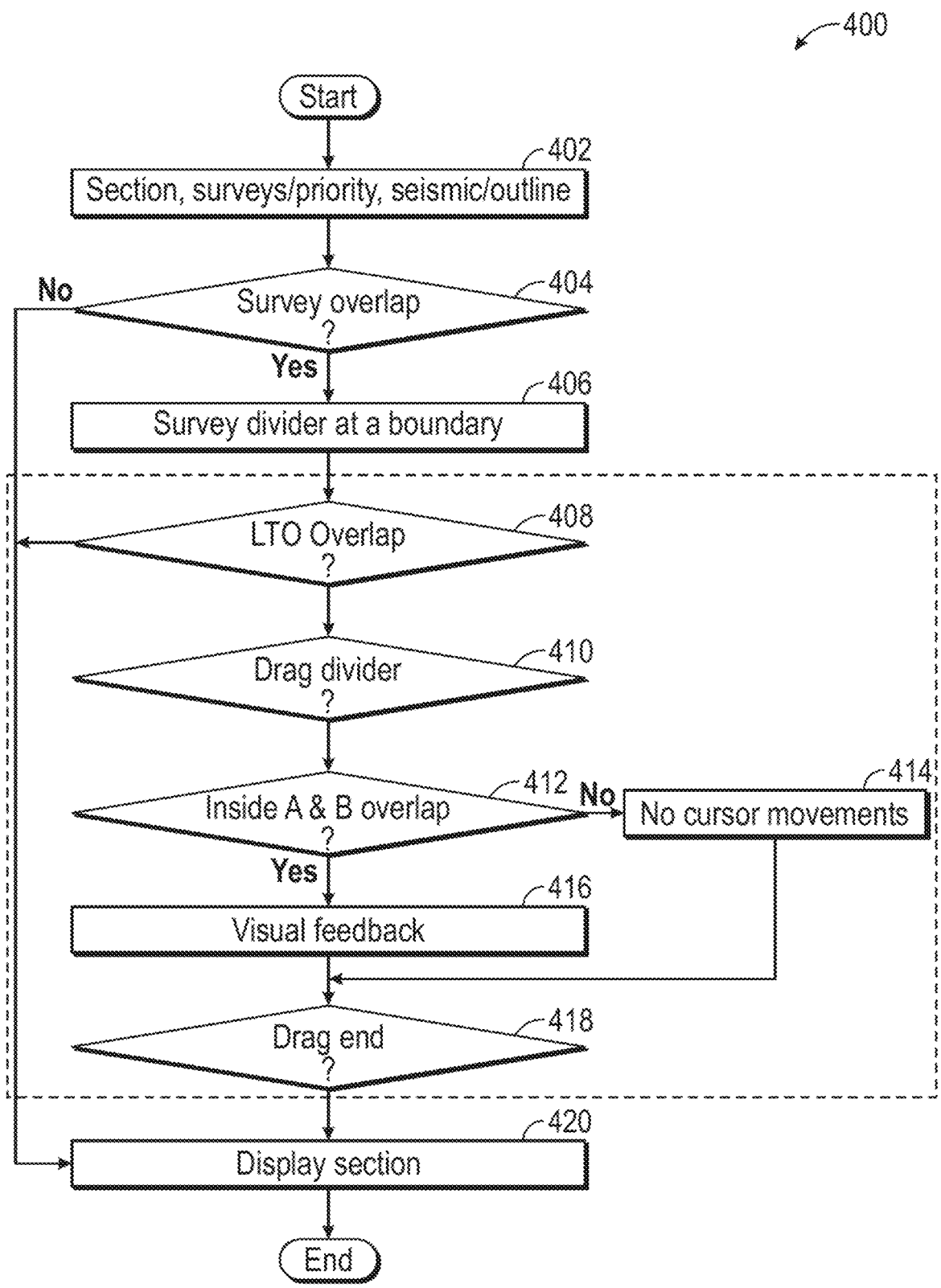
FIG. 4A is a flow chart of a more detailed method for adjusting seismic section boundaries for optimized seismic interpretation, according to certain illustrative methods of the present disclosure.
Figure 4C:
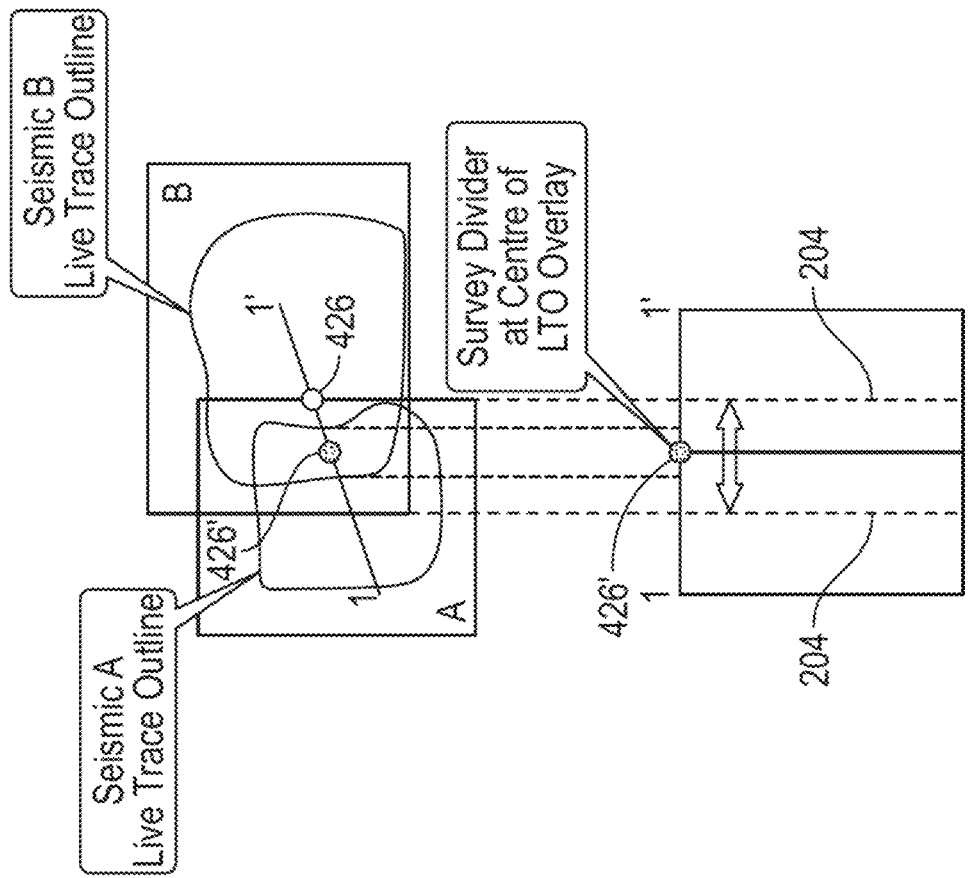
FIGS. 4B and 4C are block diagrams showing an illustrative 3D seismic section 422 and vertical seismic section 424.
Figure 4B:
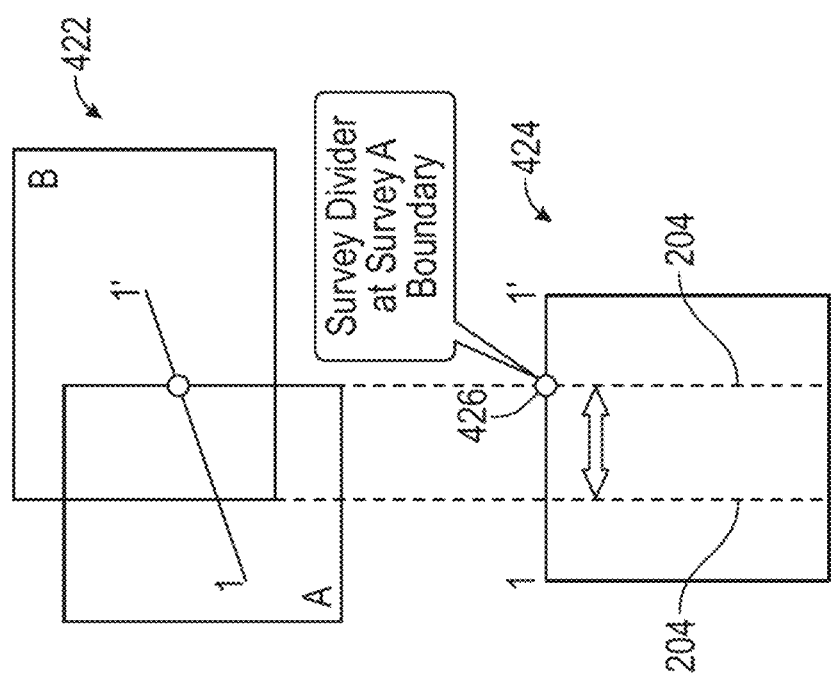

FIG. 4A is a flow chart of a more detailed method 400 for adjusting seismic section boundaries for optimized seismic interpretation, according to certain illustrative methods of the present disclosure. At block 402, the seismic data is input into the seismic interpretation system. Such data includes, for example, section, survey, priority, seismic and outline data. FIG. 4B is a block diagram showing surveys A and B input at block 402B. In this example, survey A is input as the higher priority survey as compared to survey B. "Priority" refers to one survey being displayed on top of the other survey, and may be input by the user or predefined in some other manner, such as by the computing system as a result of other seismic data input to the system. Also, in FIG. 4B, section 422 may refer to the 3D seismic data shown in windows 202A and/or 202B, while section 424 may refer to the vertical seismic section shown in window 202C of FIGS. 2A/2B. Also, in FIG. 4B, the computing system generates a cross-section line 1-1' (in response to user double click, e.g.) which corresponds to line 1-1' in vertical seismic section 424. Also, at block 402, an LTO may be selected in surveys A and B. The LTO defines where the seismic data is located.

At block 404, the computing system determines whether surveys A and B overlap, as shown in FIG. 4B. If the determination is "No," the method passes on to block 420 and the corresponding vertical seismic sections are displayed in window 202C. If, however, it is determined surveys A and B do overlap at block 404, a survey divider 426 is generated and displayed at the boundary 204 of survey A (the high priority survey), at block 406. At block 408, the computing system determines whether there is any overlap between the LTOs in FIG. 4C. This may be determined in a variety of ways, such as through the analysis of the location of the survey data, as would be understood by ordinarily skilled artisans having the benefit of this disclosure. If it is determined there is no overlap, the method passes on to block 420 where the vertical seismic sections are displayed in window 202C. However, if there is overlap of the LTOs, survey divider 426 in 3D seismic survey section 422 may be dragged from position 426 to position 426' (which is positioned in the overlapping section of the LTOs), at block 410. Although not shown, in this example, a data gap exists within the overlapping sections of the LTOs. In certain illustrative methods, as survey divider 426 is moved in section 422, the corresponding divider 426 is moved in section 424. In manual mode, the user may move survey divider 426 until the data gap is removed or minimized. In automated mode, the computing system determines, through computations, the location of the survey divider 426 so that the data gap is minimized or removed. In certain embodiments, survey divider 426 is moved from the low priority survey B toward the high priority survey A as shown in vertical seismic section 424 of FIG. 4C. In other embodiments, only the lower priority survey is moved, while in other embodiments both the higher and lower priority surveys may be moved in the overlap area in response to movement of survey divider 426. In alternative embodiments, however, survey divider 426 may be moved in other desired ways. As survey divider 426 is moved, segment boundaries 204 (shown in window 202C) are also moved.

At block 412, the computing system determines whether survey divider 426 is still inside the overlapping section of the LTOs. If the determination is "Yes," there is visual confirmation in block 416. However, if the answer is "No," there are no further movements of the cursor within the GUI (i.e., meaning survey divider 426 cannot be moved beyond the bounds of the overlapping area), and visual confirmation is also seen in block 416. At block 418, the drag function is completed and the data gap within the overlapping sections of the LTOs is also removed or minimized. At block 420, the adjusted vertical seismic section is displayed in window 202C.

As previously stated, the adjustment of the segment boundaries 204 may be accomplished in a manual mode or automated mode. In manual mode of an illustrative embodiment, the user manually adjusts the boundary 204 using survey divider 426 of the selected 3D seismic survey using a click-and-drag functionality of the GUI. In automated mode, boundary 204 of the selected 3D seismic survey is adjusted automatically by the computing device. To achieve this functionality in certain illustrative embodiments, when a seismic survey section is displayed, the default behavior of the computing system is to automatically position survey divider 426 so that areas of missing or poor quality data in the surveys are minimized (however, note in certain illustrative embodiments the user can then manually further adjust the location of divider 426 if desired). The seismic data in each survey is scanned for this purpose (minimization of poor quality data). Specifically, the highest priority displayed seismic file in each survey is determined. Then, each of these seismic files is scanned to locate the horizontal extents where data is of sufficient quality to permit interpretation (LTO), which may be determined in a variety of ways (e.g., some quality threshold). Once this is determined, survey divider 426 is automatically moved to that location permitting quality interpretation, thereby adjusting the boundary of the LTO. The presence of high quality data overrides survey priority in overlap areas, and the location of divider 426 reflects this altered priority.

Figure 5A:
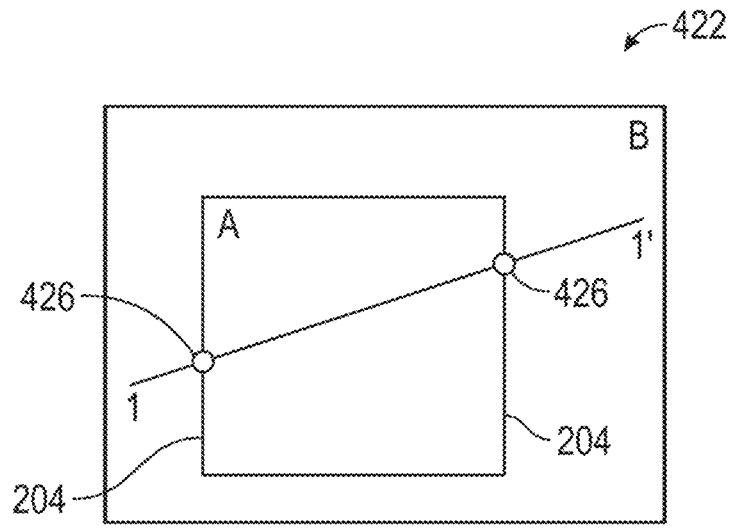
FIG. 5A is a block diagram of a 3D seismic survey section across nested 3D seismic surveys with multiple overlapping zones.
Figure 5B:
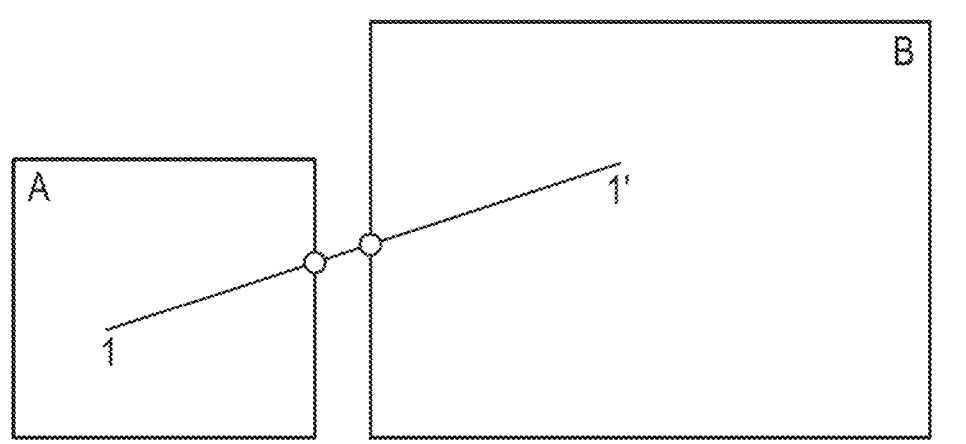
FIG. 5B is a block diagram of a 3D seismic survey section have one survey positioned completely outside the other survey.

FIG. 5A is a diagram of a 3D seismic survey section 422 across nested 3D seismic surveys with multiple overlapping zones. In such an embodiment, multiplied survey dividers 426 are used to adjust boundaries 204 within the overlapping LTO sections. FIG. 5B is a diagram of an illustrative 3D seismic survey section 422 across non-overlapping 3D seismic interpretation. Here, survey A is outside survey B. In such an embodiment, block 404 of method 400 passes on to block 420 and displays accordingly.

Figure 6A:
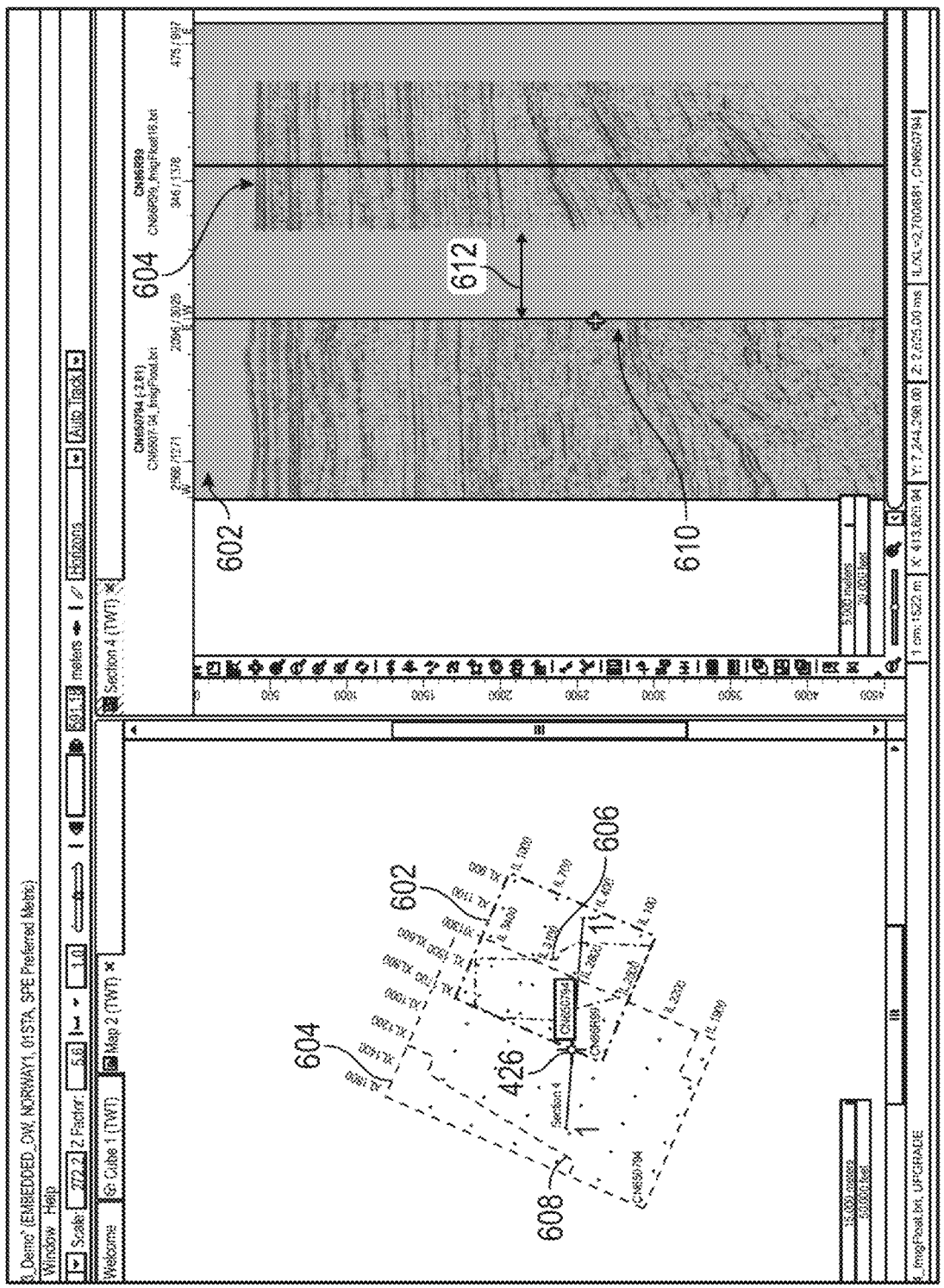
FIGS. 6A-6F are example GUIs of 3D seismic surveys and corresponding vertical seismic sections, according to illustrative methods of the present disclosure.

FIGS. 6A-6F are example GUIs of 3D seismic surveys and corresponding vertical seismic sections, according to illustrative methods of the present disclosure. FIG. 6A shows 3D seismic surveys on the left and corresponding vertical seismic sections on the left. Pursuant to illustrative methods described herein, the 3D seismic surveys include a high priority survey 602 positioned above a lower priority survey 604, each having its respective LTOs 606 and 608. Survey divider 426 is initially positioned at the boundary of high priority survey 602, with the corresponding cursor 610 positioned within the vertical seismic section. As can be seen, a data gap 612 is present between high priority survey 602 and lower priority survey 604.

Figure 6B:
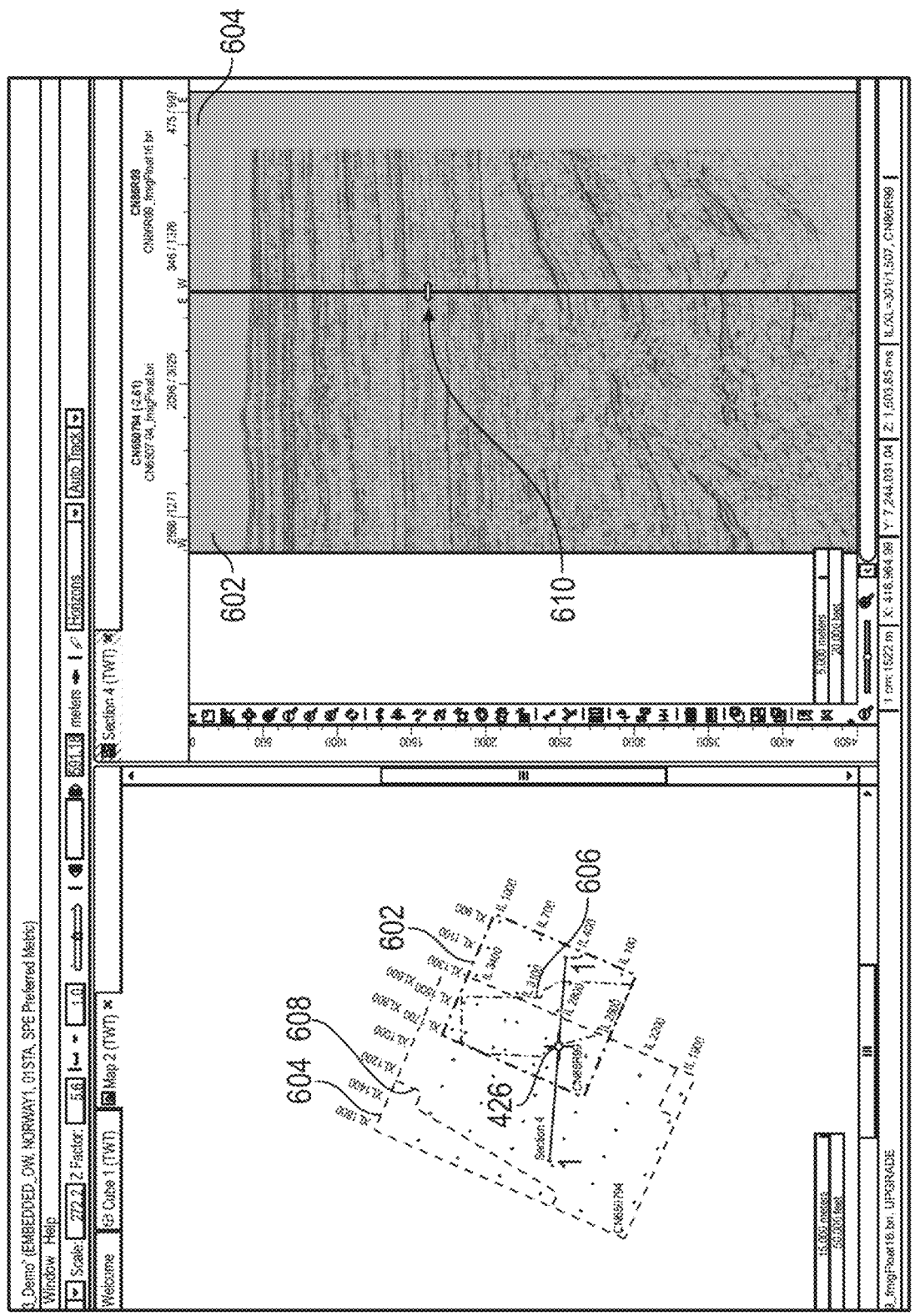
Figure 6C:
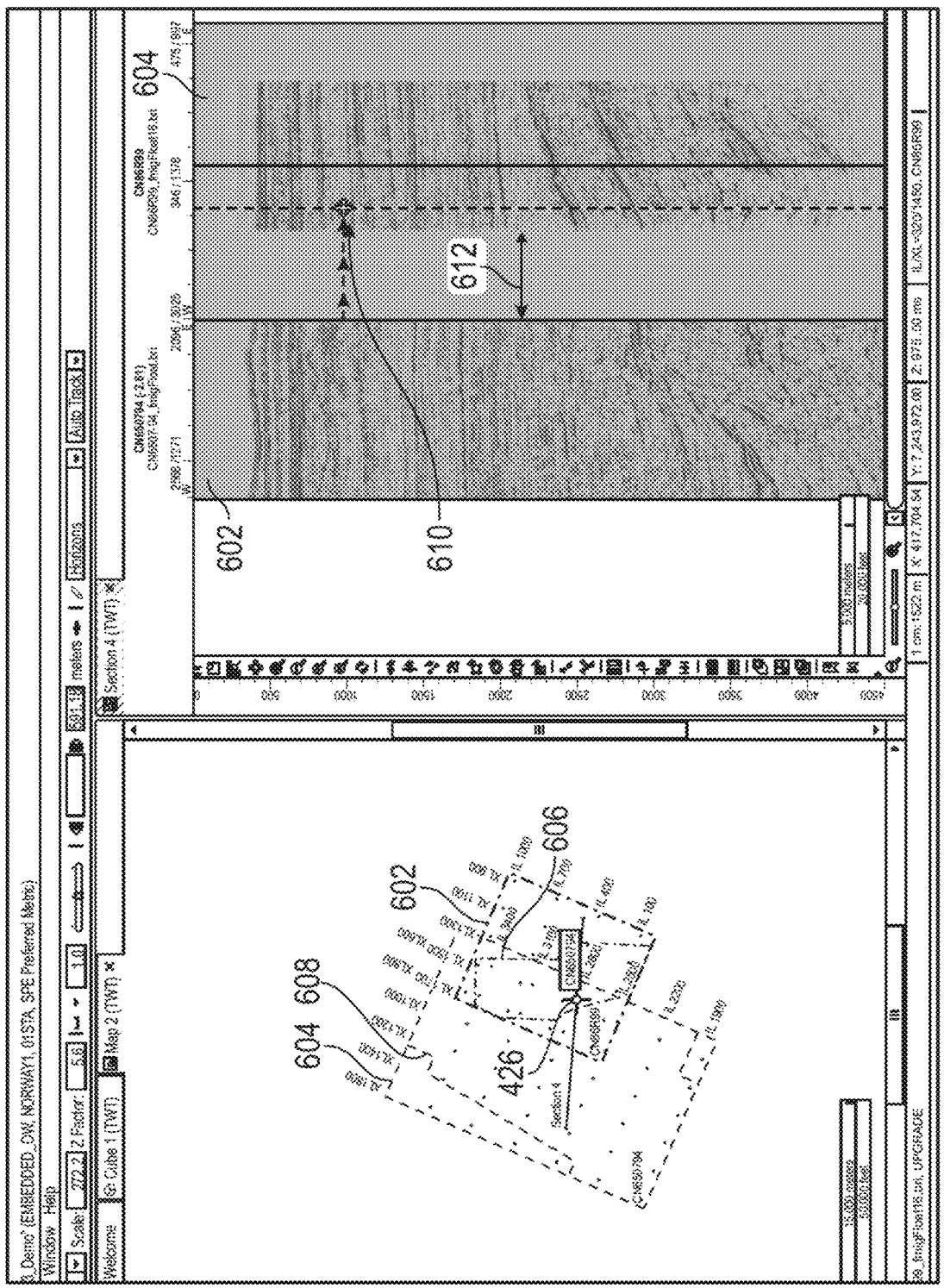

FIG. 6B shows survey divider 426 has been moved along cross-section line 1-1' (e.g., using a double-click), thereby automatically adjusting the boundary of higher priority survey 602 within the vertical seismic section such that the data gap is no longer present, according to illustrative methods of the present disclosure described above. Using the double-click, survey divider 426 automatically moves to the boundary of LTO 606, thereby automatically adjusting the boundary of higher priority survey 602 in the vertical seismic section and removing gap 612. Alternatively, FIG. 6C illustrates how survey divider 426 may be manually interactively dragged to an area within the overlapping LTOs 606 and 608, thereby simultaneously moving corresponding cursor 610 toward lower priority survey 604, as shown. Once survey divider 426 is released, the boundary of higher priority survey 602 will be moved toward lower priority survey 604 (in the vertical seismic section), thereby removing data gap 612.

Figure 6D:
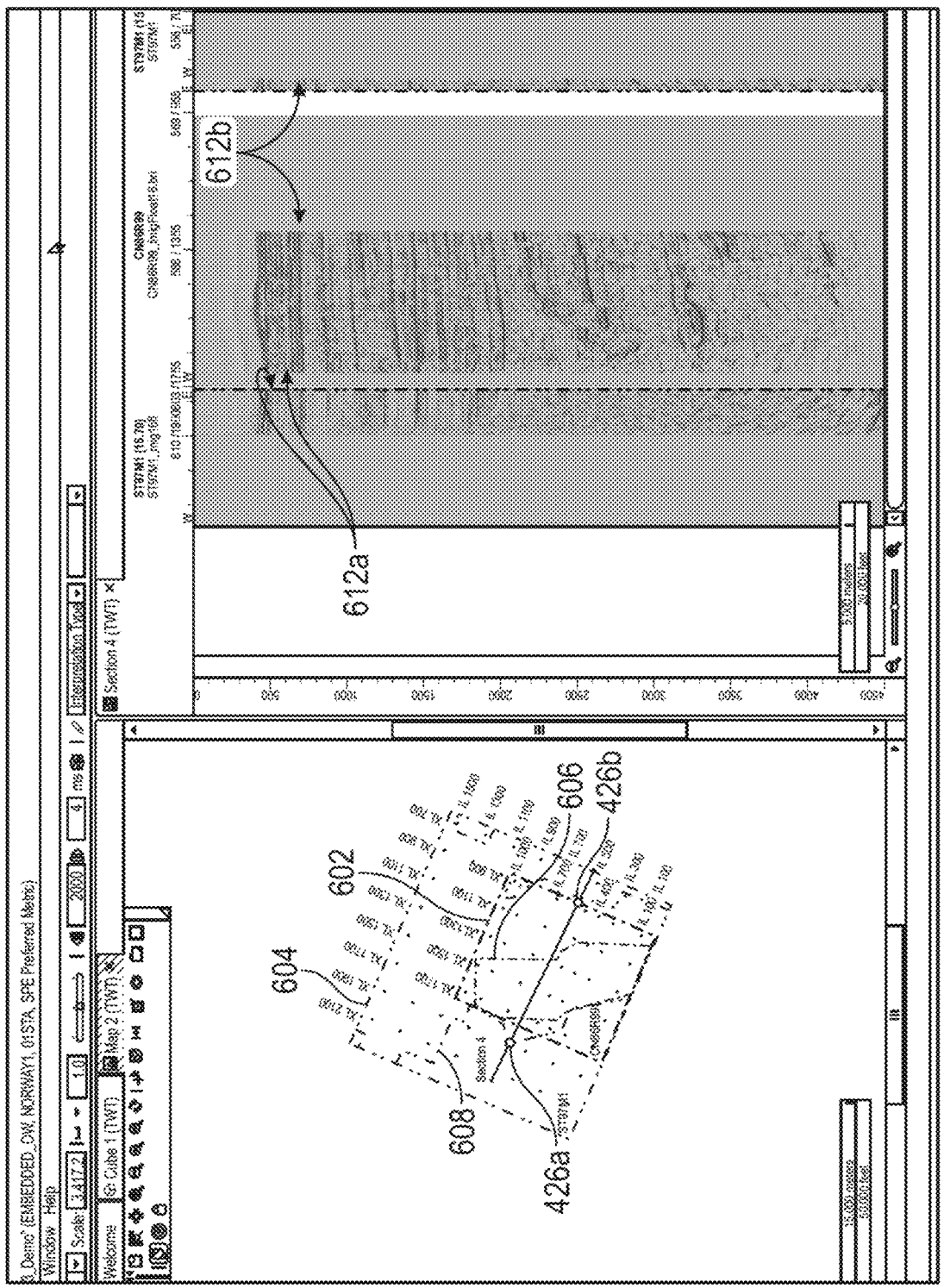
Figure 6E:
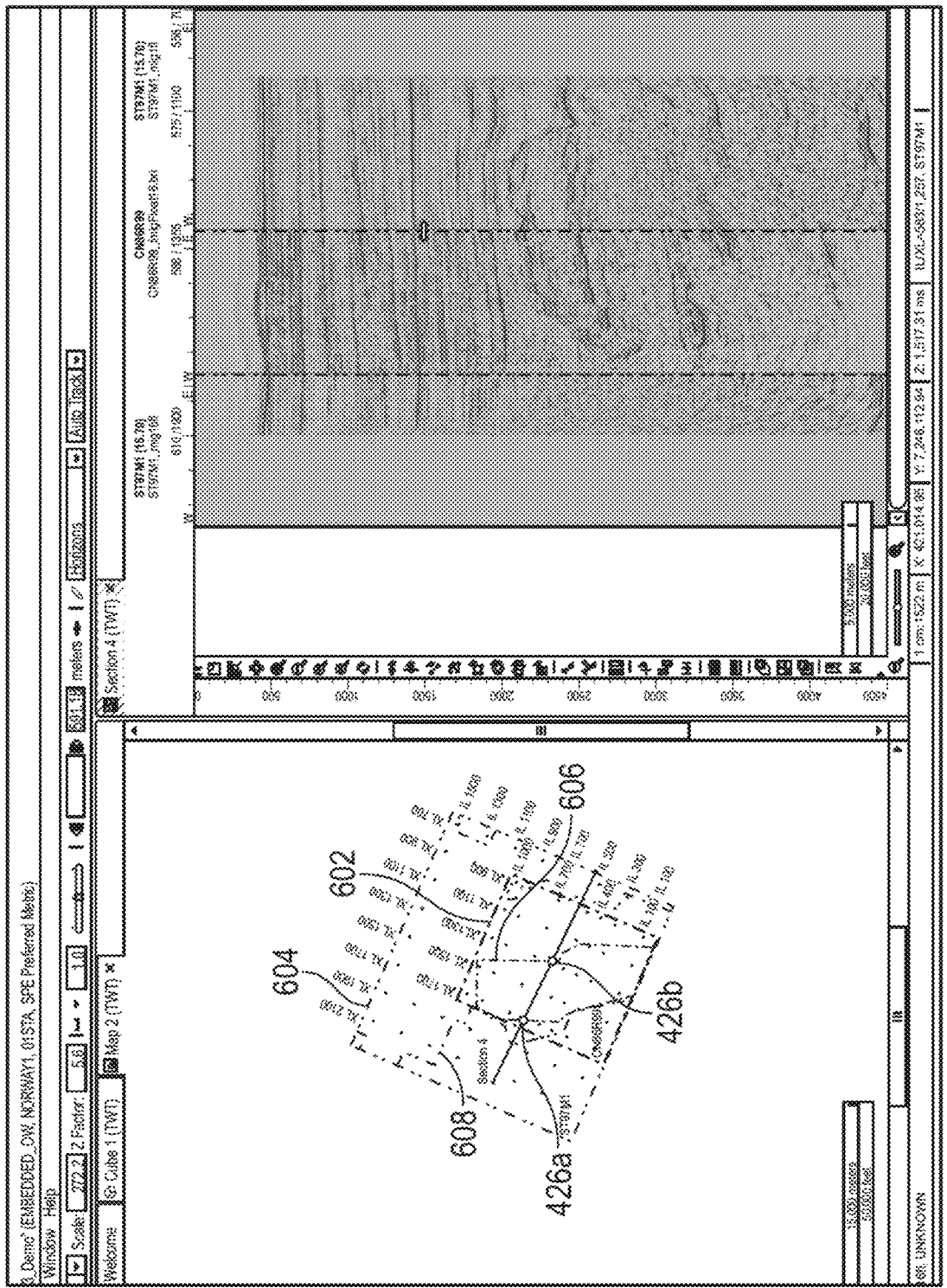
Figure 6F:
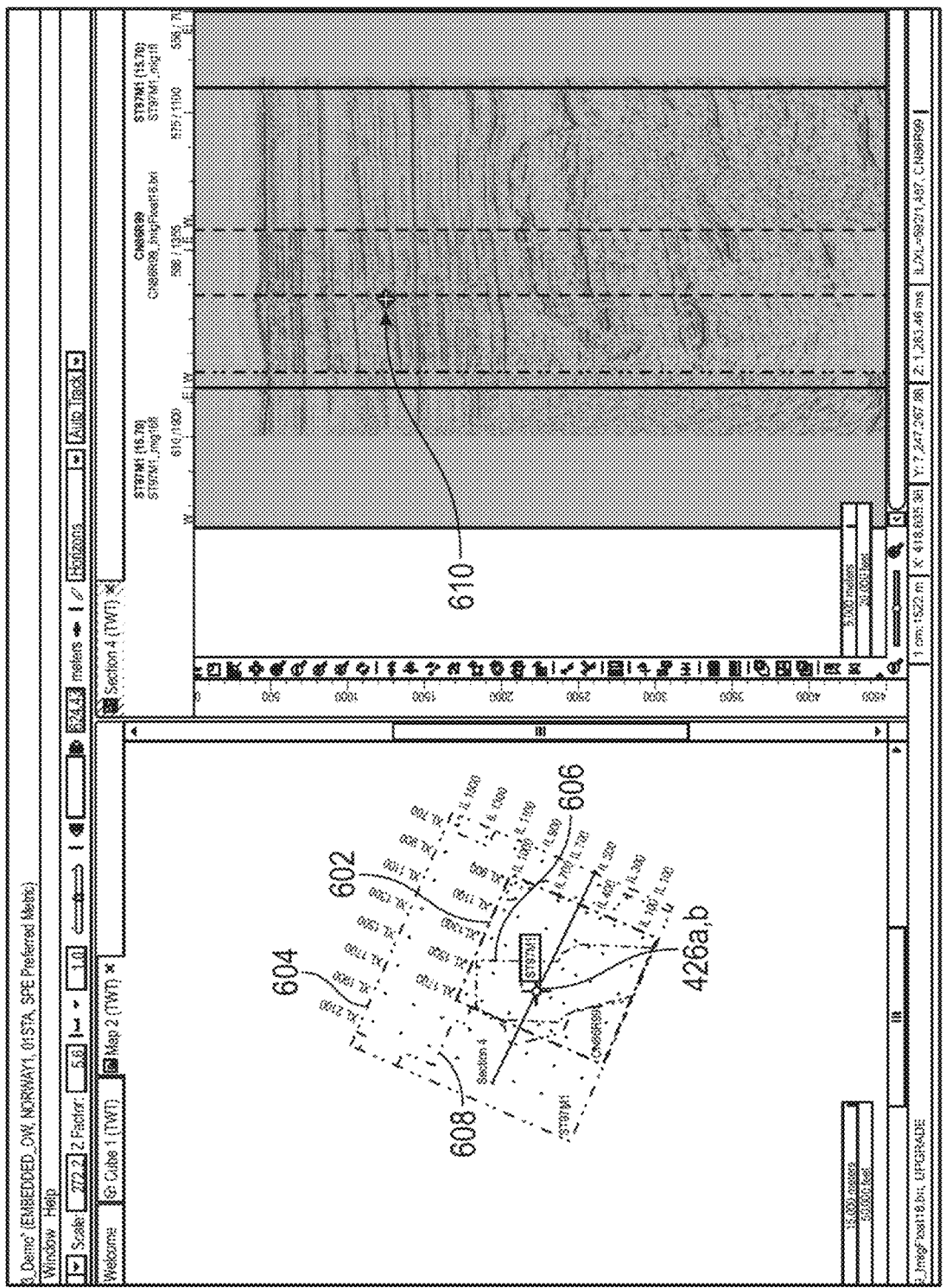

FIG. 6D shows an example where high priority survey 602 is embedded within lower priority survey 604, thereby generating two survey dividers 426a and 426b. At the same time, two data gaps 612a and 612b are also present within the corresponding vertical seismic section. FIG. 6E illustrates the automated movement of survey dividers 426a and 426b to boundaries of overlapping LTOs 606 and 608 (positioned along positioned along cross-section 1-1'), thereby also removing data gaps 612a and 612b. The automated movement may be generated using any variety of interactive functions (e.g., double-click). Alternatively, either of survey dividers 426a or 426b may be clicked-and-dragged within the overlapping LTOs 606 and 608 manually by a user (which also moves corresponding cursor 610), thereby again removing data gaps 612a and 612b, as shown in FIG. 6F. Although not shown, note that more than two surveys may be simulated and assigned relative priority according to methods disclosed herein, as would be understood by those ordinarily skilled in the art having the benefit of this disclosure.

Moreover, in certain other illustrative embodiments, in case of a region where 3 or more surveys overlap, e.g., surveys A, B, and C. Their "static" priorities are A>B>C. Assume A overlaps with B, and B overlaps with C. The overlap area between lower priority surveys B and C may be partly covered by higher priority survey A. Therefore, when moving survey divider which divides B and C, it is constrained by the current location of the survey divider between A and B. If the latter is moved, these constraints are altered.

Figure 7:
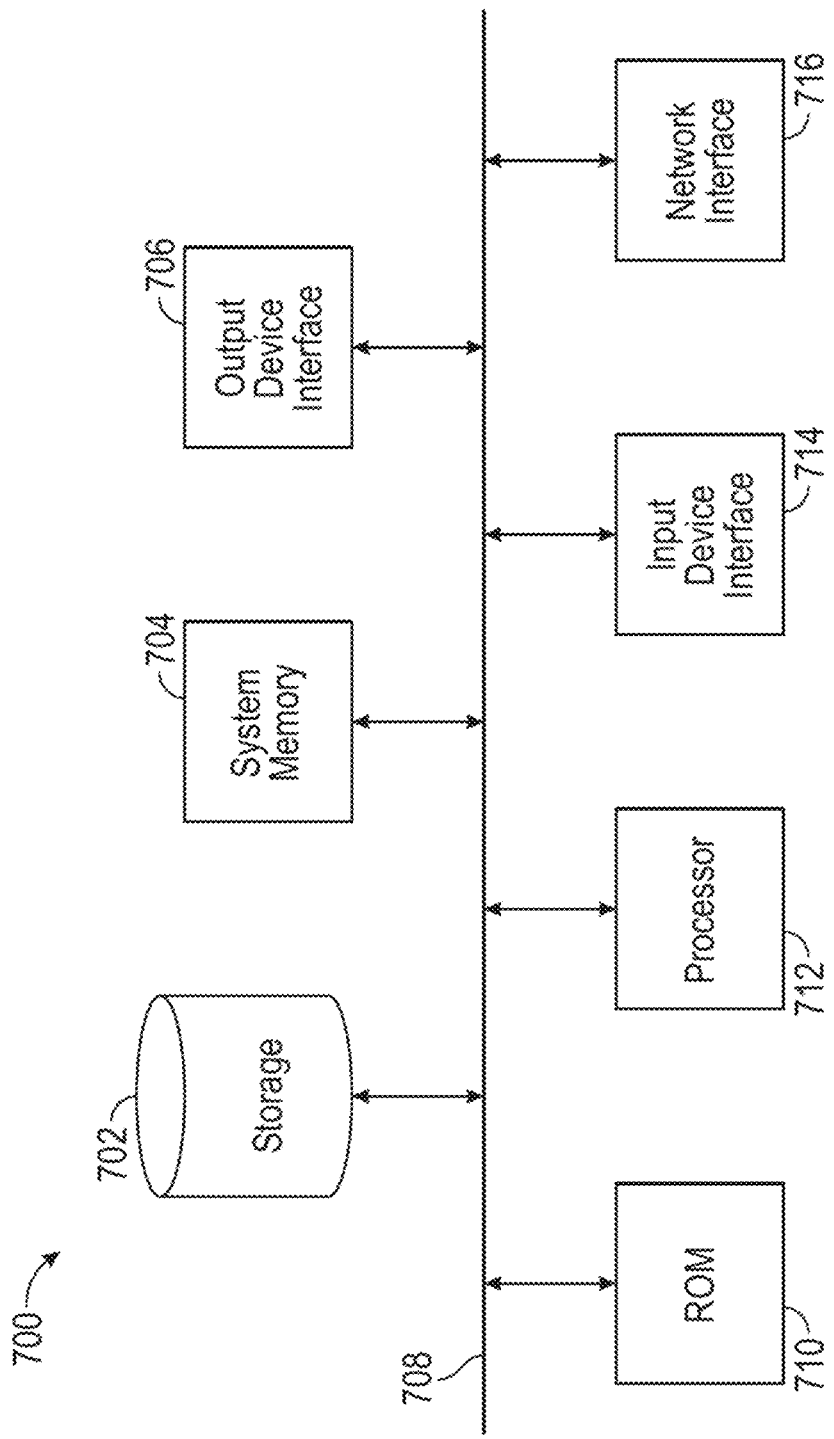
FIG. 7 is a block diagram illustrating an example of a computer system in which embodiments of the present disclosure may be implemented.

FIG. 7 is a block diagram illustrating an example of a computer system 700 in which embodiments of the present disclosure may be implemented. For example, method 300 of 400 of FIGS. 3 and 4, as described above, may be implemented using system 700. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory ("ROM") 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for computer aided pipe string design based on existing string designs in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs ("CD-ROM"), recordable compact discs ("CD-R"), rewritable compact discs ("CD-RW"), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits ("ASICs") or field programmable gate arrays ("FPGAs"). In some implementations, such integrated circuits execute instructions that are stored on the circuit itself. Accordingly, methods 300 or 400, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, the illustrative embodiments described herein empower interpreters to generate meaningful displays of vertical seismic sections across multiple 3D surveys with the least amount of button clicks. The embodiments take into account the most critical info of surveys and priority, seismic volume and liver trace outlines to create the optical seismic displays for interpretation and analysis of the overlapping sections.

Embodiments and methods of the present disclosure described herein further relate to any one or more of the following paragraphs:

1. A computer-implemented method of adjusting seismic section boundaries for optimized seismic interpretation, the method comprising displaying a vertical seismic section across a plurality of three-dimensional ("3D") seismic surveys within a graphical user interface ("GUI") of an application executable on a user computing device; identifying an outline of a live seismic trace from seismic volumes represented in the vertical seismic section, the outline being referred to as a live trace outline ("LTO"); upon determining that at least two of the 3D seismic surveys are overlapping, determining whether any data gaps exist within at least one of the LTOs identified for an area of the vertical seismic section corresponding to the overlapping 3D seismic surveys; and upon determining a data gap does exist, adjusting a boundary of a selected one of the overlapping 3D seismic surveys so as to remove or minimize the data gap from the corresponding area of the vertical seismic section.

2. The computer-implemented method as defined in paragraph 1, wherein a user manually adjusts the boundary of the selected 3D seismic survey using a click-and-drag functionality of the GUI.

3. The computer-implemented method as defined in paragraphs 1 or 2, wherein the boundary of the selected 3D seismic survey is adjusted automatically by the computing device.

4. The computer-implemented method as defined in any of paragraphs 1-3, wherein the automated adjustment comprises determine which of the overlapping 3D seismic surveys is a high priority survey; scanning the high priority survey to determine areas meeting a quality threshold; and adjusting the boundary of the high priority survey based upon the areas meeting the quality threshold.

5. The computer-implemented method as defined in any of paragraphs 1-4, wherein adjusting the boundary comprises determining which of the overlapping 3D seismic surveys is a high priority survey and low priority survey; and only adjusting the boundary of the low priority survey so that the data gap between the high and low priority survey is removed or minimized.

6. The computer-implemented method as defined in any of paragraphs 1-5, further comprising performing a wellbore operation using the optimized seismic interpretation.

7. A system for adjusting seismic section boundaries for optimized seismic interpretation, the system comprising non-transitory memory storing a plurality of seismic surveys; and one or more hardware processors coupled to the non-transitory memory and configured to execute instructions to cause the system to perform operations comprising: displaying a vertical seismic section across a plurality of three-dimensional ("3D") seismic surveys within a graphical user interface ("GUI") of an application executable on a user computing device; identifying an outline of a live seismic trace from seismic volumes represented in the vertical seismic section, the outline being referred to as a live trace outline ("LTO"); upon determining that at least two of the 3D seismic surveys are overlapping, determining whether any data gaps exist within at least one of the LTOs identified for an area of the vertical seismic section corresponding to the overlapping 3D seismic surveys; and upon determining a data gap does exist, adjusting a boundary of a selected one of the overlapping 3D seismic surveys so as to remove or minimize the data gap from the corresponding area of the vertical seismic section.

8. The system as defined in paragraph 7, wherein a user manually adjusts the boundary of the selected 3D seismic survey using a click-and-drag functionality of the GUI.

9. The system as defined in paragraphs 7 or 8, wherein the boundary of the selected 3D seismic survey is adjusted automatically by the computing device.

10. The system as defined in any of paragraphs 7-9, wherein the automated adjustment comprises determining which of the overlapping 3D seismic surveys is a high priority survey and low priority survey; and only adjusting the boundary of the low priority survey so that the data gap between the high and low priority survey is removed or minimized.

11. The system as defined in any of paragraphs 7-10, wherein adjusting the boundary comprises determining which of the overlapping 3D seismic surveys is a high priority survey and low priority survey; and only adjusting the boundary of the low priority survey so that the data gap between the high and low priority survey is removed or minimized.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method of adjusting seismic section boundaries for optimized seismic interpretation, the method comprising:
    displaying a vertical seismic section across a plurality of three-dimensional ("3D") seismic surveys within a graphical user interface ("GUI") of an application executable on a user computing device;
    identifying an outline of a live seismic trace from seismic volumes represented in the vertical seismic section, the outline being referred to as a live trace outline ("LTO");
    upon determining that at least two of the 3D seismic surveys are overlapping, determining whether any data gaps exist within at least one of the LTOs identified for an area of the vertical seismic section corresponding to the overlapping 3D seismic surveys; and
    upon determining a data gap does exist, adjusting a boundary of a selected one of the overlapping 3D seismic surveys so as to remove or minimize the data gap from the corresponding area of the vertical seismic section.

2. The computer-implemented method as defined in claim 1, wherein a user manually adjusts the boundary of the selected 3D seismic survey using a click-and-drag functionality of the GUI.

3. The computer-implemented method as defined in claim 1, wherein the boundary of the selected 3D seismic survey is adjusted automatically by the computing device.

4. The computer-implemented method as defined in claim 3, wherein the automated adjustment comprises:
    determine which of the overlapping 3D seismic surveys is a high priority survey;
    scanning the high priority survey to determine areas meeting a quality threshold; and
    adjusting the boundary of the high priority survey based upon the areas meeting the quality threshold.

5. The computer-implemented method as defined in claim 1, wherein adjusting the boundary comprises:
   determining which of the overlapping 3D seismic surveys is a high priority survey and low priority survey; and
   only adjusting the boundary of the low priority survey so that the data gap between the high and low priority survey is removed or minimized.

6. The computer-implemented method as defined in claim 1, further comprising performing a wellbore operation using the optimized seismic interpretation.

7. A system for adjusting seismic section boundaries for optimized seismic interpretation, the system comprising:
   non-transitory memory storing a plurality of seismic surveys; and
   one or more hardware processors coupled to the non-transitory memory and configured to execute instructions to cause the system to perform operations comprising:
      displaying a vertical seismic section across a plurality of three-dimensional ("3D") seismic surveys within a graphical user interface ("GUI") of an application executable on a user computing device;
      identifying an outline of a live seismic trace from seismic volumes represented in the vertical seismic section, the outline being referred to as a live trace outline ("LTO");
      upon determining that at least two of the 3D seismic surveys are overlapping, determining whether any data gaps exist within at least one of the LTOs identified for an area of the vertical seismic section corresponding to the overlapping 3D seismic surveys; and
      upon determining a data gap does exist, adjusting a boundary of a selected one of the overlapping 3D seismic surveys so as to remove or minimize the data gap from the corresponding area of the vertical seismic section.

8. The system as defined in claim 7, wherein a user manually adjusts the boundary of the selected 3D seismic survey using a click-and-drag functionality of the GUI.

9. The system as defined in claim 7, wherein the boundary of the selected 3D seismic survey is adjusted automatically by the computing device.

10. The system as defined in claim 9, wherein the automated adjustment comprises:
    determining which of the overlapping 3D seismic surveys is a high priority survey and low priority survey; and
    only adjusting the boundary of the low priority survey so that the data gap between the high and low priority survey is removed or minimized.

11. The system as defined in claim 7, wherein adjusting the boundary comprises:
    determining which of the overlapping 3D seismic surveys is a high priority survey and low priority survey; and
    only adjusting the boundary of the low priority survey so that the data gap between the high and low priority survey is removed or minimized.

12. A non-transitory computer-readable medium comprising instructions which, when executed by a processor, causes the processor to perform the method of claim 1.

* * * * *